P. BORG.
LOAD BINDER.
APPLICATION FILED JAN. 22, 1916.
1,243,247.
Patented Oct. 16, 1917.
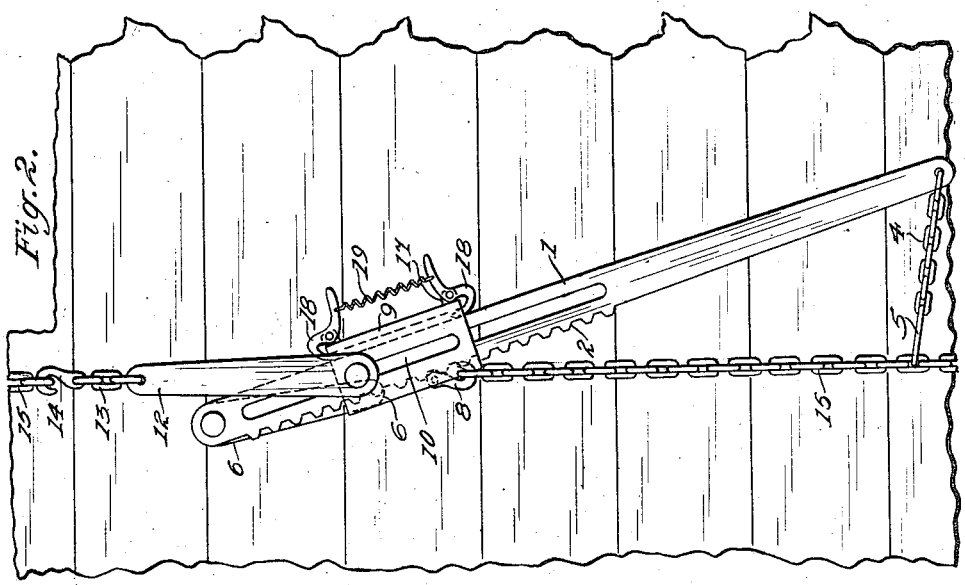
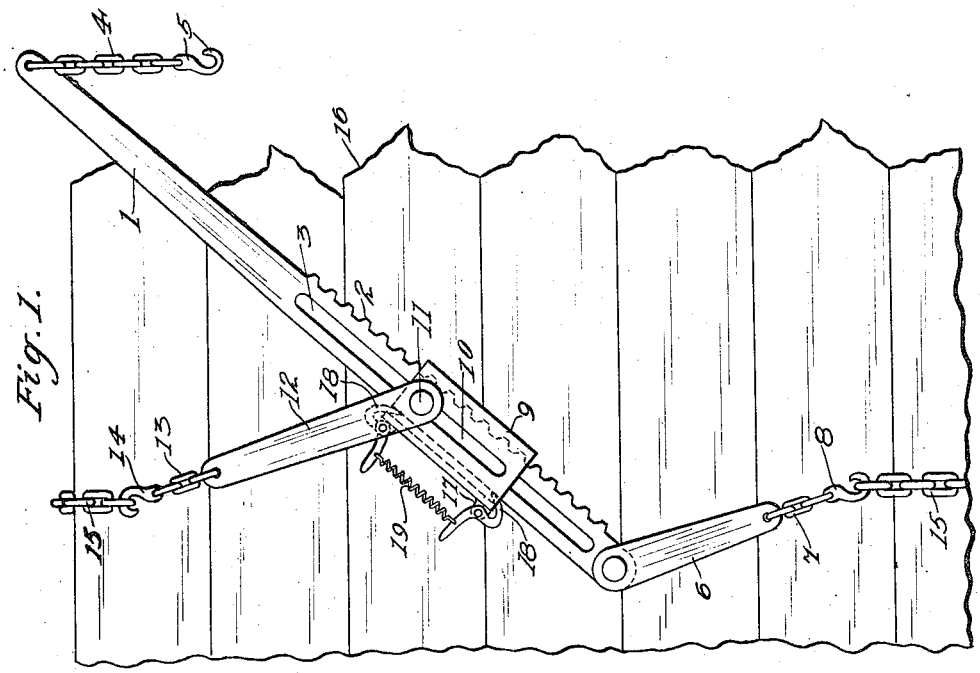
Witnesses
Paul A. Viesen
Thomas J. Morgan
Inventor
P. Borg
H. J. Sanders
Atty.

UNITED STATES PATENT OFFICE.

PETER BORG, OF SHELDON, IOWA.

LOAD-BINDER.

1,243,247.  Specification of Letters Patent.  Patented Oct. 16, 1917.

Application filed January 22, 1916. Serial No. 73,538.

*To all whom it may concern:*

Be it known that I, PETER BORG, a citizen of Sweden, residing at Sheldon, in the county of O'Brien and State of Iowa, have invented certain new and useful Improvements in Load-Binders, of which the following is a specification.

This invention relates to improvements in load binders and its object is to produce a device of this class that is simple in construction, efficient in operation and cheap to manufacture. With the foregoing and other objects in view the invention consists in the combination and arrangement of parts to be hereinafter fully described in the following specification, pointed out in the appended claims and illustrated in the accompanying drawing which forms a part of said specification and in which:—

Figure 1 is a side view of the invention applied to a load in open position.

Fig. 2 is a similar view in closed position.

Like reference characters denote corresponding parts in both views.

The reference numeral 1 denotes a lever formed along one edge with a rack 2 and formed, further, with a longitudinal slot 3, and provided at one end with a length of chain 4 that is provided terminally with a hook 5. A link 6 is pivotally carried at the opposite end of the lever 1 and said link carries a chain 7 provided with a hook 8. A sleeve-like block 9, substantially rectangular in cross section, is slidably arranged upon the lever 1 and the opening in said block through which the lever 1 extends is of considerably greater diameter than the lever to enable the said block to slide over the lever without engaging the rack 2 if desired. The block 9 is formed with longitudinally extending apertures 10 which register with each other and with the slot 3 in the lever 1 and a pin 11 extends through said alined openings and pivotally carries a link 12 which is provided with a chain 13 having a hook 14 at its end. A length of chain 15 is used to partly or entirely encompass the load 16.

Referring again to the said block 9 the same is formed with an interior rack capable of engagement with the rack 2 of the lever 1 and, further, it is formed with ears 17 that pivotally carry hooks 18, the straight ends of which are connected by an expansion spring 19, the curved ends of said hooks being adapted for insertion between the block 9 and lever 1 when it is desired to lock said block in engagement with the rack 2 of said lever. In operation the chain 16 is passed about the load and the ends of the chain engaged by the hooks 8 and 14; the lever 1 and connections will then stand in substantially the position shown in Fig. 1. The lever 1 is now moved, by pressure applied at its free end, about the pin 11 as a fulcrum until the chain 15 is drawn taut, said pin or fulcrum being movable together with the said block 9 along the lever 1 to take out any slack in said chain. The block is now locked in engagement with the lever by means of the hooks 18 and the hook 5 placed in engagement with one of the links of the chain 15 and the load is securely bound.

What is claimed is:—

1. In a load binder, a longitudinally slotted lever, a slotted sleeve slidably and adjustably associated with said lever, a pin extending through the alined openings in said members, a link carried by said pin, a hook carried by said link, another link terminally carried by said lever, a hook carried by said link, a length of chain adapted to encompass the load and engage the said hooks, a length of chain carried at one end of the said slotted lever and a hook carried by said chain for engagement with one of the links of the first mentioned chain.

2. In a load binder, a slotted and serrated lever, a perforated block slidable over said lever and formed with a rack for engagement with the serrated portion of said lever, means carried by said block for releasably locking it in adjusted relation with said lever, said means including a pair of oppositely disposed hooks adapted for insertion between the ends of said blocks and the said lever, a link carried by said block and adjustable with relation thereto, a link terminally carried by said lever, a length of chain adapted for engagement with the said hooks and a hooked length of chain carried by said lever for engagement with the first mentioned length of chain.

3. In a load binder, a slotted serrated lever, a perforated block slidable over said lever and formed with a rack for engagement with the serrated portion of said lever, ears formed upon said block, hooks pivotally carried by said ears whereby said block and lever may be releasably locked in adjusted relation, an expansion spring connecting said hooks for yieldingly retaining them in operative position, a link carried by said block and adjustable with relation thereto, a link terminally carried by said lever, a length of chain adapted for engagement with the said hooks, and a hooked length of chain carried by said lever for engagement with the first mentioned length of chain.

In testimony that I claim the foregoing as my own I have hereto affixed my signature in the presence of two subscribing witnesses.

PETER BORG.

Witnesses:
F. C. BURKLE,
HAL H. LANG.